United States Statutory Invention Registration [19]

[11] Reg. Number: H932

Ng

[43] Published: Jul. 2, 1991

[54] PROJECTILE FIN

[75] Inventor: Chiu H. Ng, Wharton, N.J.

[73] Assignee: The United States of America as represented by the Secretary of the Army, Washington, D.C.

[21] Appl. No.: 612,238

[22] Filed: Nov. 13, 1990

[51] Int. Cl.[5] ..... F42B 10/08

[52] U.S. Cl. ..... 244/3.23

*Primary Examiner*—Michael J. Carone

*Attorney, Agent, or Firm*—Anthony T. Lane; Edward Goldberg; Edward F. Costigan

[57] ABSTRACT

The invention is a projectile stabilizing fin formed with a laterally extending flat, triangular shaped tab positioned so that one point of the triangle points in the direction of the intended projectile direction and tilted so that air flow will impinge on the tab surface and cause the projectile to spin. Such construction is particularly useful for projectiles launched from smooth bore guns at high Kinetic Energy.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROJECTILE FIN

GOVERNMENTAL INTEREST

The invention described herein may be manufactured, used and licensed by or for the Government for Governmental purposes without the payment to me of any royalties thereon.

BACKGROUND OF THE INVENTION

This invention relates to a stabilizing fin used to stabilize projectiles or missiles launched at high muzzle velocity.

Current high length to diameter ratio missiles or projectiles such as projectiles fired from a tank must be statically stabilized by fins projecting from the missile body generally from its trailing end. When such projectiles are fired from smooth bore guns, such fins (generally 3 to 6 in number) must generate a roll or spin to the projectile by aerodynamic means. Such spin must be at a rate necessary to average out the transverse lift due to asymmetry resulting from manufacturing inaccuracies.

Projectile fins are presently fabricated from aluminum because of its weight and a low cost. To achieve spin such aluminum fins are typically mechanically beveled at their leading and/or trailing edges or they are canted to aerodynamically induce the necessary torque for the required spin rate.

However todays and future projectile requirements include higher impact velocities and aluminum or aluminum base alloys fail to meet the requirements of such increased velocities because aluminum fins tend to burn or melt due to aerodynamic heating at such velocities.

SUMMARY OF THE INVENTION

It has been determined that high strength, high melting alloys such as those of steel can be used to make such fins that do not melt or burn and which improve the aerodynamic properties of such fins. However weight considerations require such fins to be substantially thinner than aluminum alloy fins and consequently may not be beveled to effect the necessary spin to the projectile.

The present invention is the discovery that flat triangular shaped fin tabs may be provided to the outer surface or tip chord of such fins that will provide the necessary torque to the projectile for stabilization at high kinetic energy (KE) velocities.

The triangular shaped tabs extend laterally from each fin pointing into the direction of intended projectile travel and tilted in respect to such direction to form an angle in respect to the axis or direction of travel of the missile. In this position the air flow pressure on the tilted tabs will effect the necessary torque on the missile to achieve the desired rotation. The exact tab dimension, position on the fin angle of tilt and uniformity on each fin will, of course, depend on the exact requirements of the missile itself (i.e. size, velocity, application).

It is the object of this invention to provide improved stabilizing fins for projectiles that are launched from smooth bore guns at high velocity.

Figure 1:
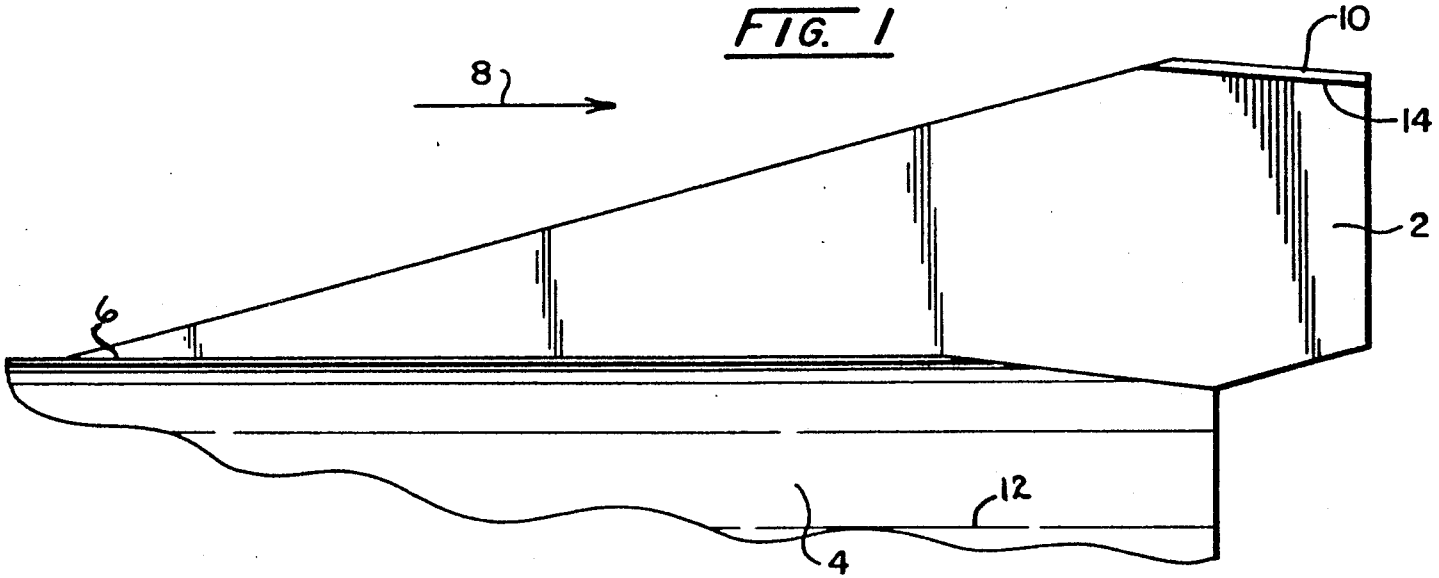
FIG. 1 is a side view of a projectile fin showing the fin tab construction of the present invention and shown as attached to a portion of a projectile.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

Figure 2:
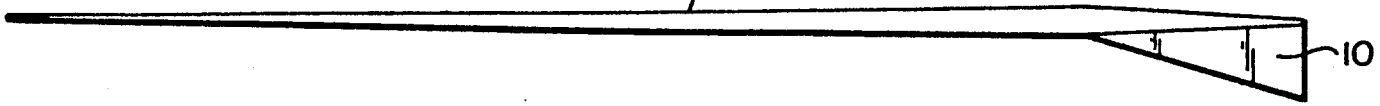
FIG. 2 is a top view of the projectile fin of FIG. 1.

In the drawing of FIG. 1, projectile fin 2 is shown as attached to a typically cylindrically shaped projectile 4 (only a portion of which is shown). Fin 2 is itself of generally elongated flat triangular shape extending transversely from the projectile along planes containing its axis with sharpest angle point 6 pointed in the direction the missile 4 will travel as opposed to the direction of air flow 8. The fin tab 10 of the present invention as shown by FIG. 2 is also of flat triangular shape (but may be of other aerodynamic shape). Fin tab 10 is attached to (or being an integral part of) fin 2 and extends laterally from the surface of fin 2 and one point of the tab also points into the direction the missile 4 will travel as opposed to the direction of air flow 8. (FIG. 2)

Fin tab 10 as shown by FIG. 1 is angularly positioned in respect to the axis 12 of projectile 4 and thus the direction of travel of the missile and the opposite direction of air flow 8.

This angle results in air pressure on the surface 14 of the fin tab 10 by air flow 8 causing torque forces on the tab and spin to the missile. The exact angle tab 10 forms in respect to the intended direction of the missile (and thus opposite air flow 8) is, of course, dependent on the spin or rotation requirement of the exact missile. However, such angle will be expected to be within the range of from about 2 degrees to 7 degrees.

The embodiment of the present invention depicted by FIGS. 1 and 2 show tab 10 extending laterally at a 90 degree angle from the upper rear edge of fin 2. The tab 10 is positioned angularly upward in respect to air flow 8 (or axis 12) and is positioned on the left hand side (looking forward) of the fin so that the missile will spin clockwise. This is the conventional arrangement, however, obviously it may be desired to place fin tab 2 elsewhere on fin 2, on the opposite side of the fin and angled downwardly or upwardly depending on the exact projectile to which it is applied and the results desired. The triangular shape of fin tab 2 may also vary from a perfect triangle to one of greater length than that shown by FIGS. 1 and 2 depending on the exact parameter sought.

The fin 2 of the present invention may also vary in shape but is preferably of the shape shown by FIGS. 1 and 2.

Fin 2 and fin tab 10 of the present invention can be made with steel or any other material of higher heat resistance and strength than aluminum or aluminum base alloys.

Fin 2 and fin tab 10 is designed for a kinetic energy (KE) projectile launched at high supersonic muzzle velocity, especially from a smooth bore gun tube. This fin can be made with steel or any other high melting temperature and high strength metal such as stainless steel. With these materials, the fin burning due to aerodynamic heating is eliminated and a low aerodynamic drag is accomplished because of the thin fin blades. However, since the projectile is fired from a smooth bore gun tube, projectile spin rate has to be attained by aerodynamic means. The spin rate is necessary to even out the transverse lift due to asymmetry resulting from manufacturing for flight stability and accuracy requirements. The spin rate of a KE projectile is extremely difficult, if not impossible to control by beveling a thin fin due to the expensive manufacturing accuracy required. The small fin tab 10 is attached to the tip of each fin blade 2 to generate spin moment instead of beveling. The size and the tilt angle of the tab can be adjusted very easily to obtain proper spin rate to avoid resonant flight instability occurrence with the nutational frequency of the projectile or the bending frequency of the penetrator (mechanical resonance).

A fin design, similar to the one shown in FIGS. 1 and 2, has been fabricated from stainless steel by using the investment casting technique. This fin was 4.25 inches in length, 0.90 inches wide (at its trailing edge) and 0.074 inches thick (at it thickest dimension). The fin tab was 0.038 inches in thickness and was tilted at a 5 degree angle in respect to the axis of the missile. The test results from Yuma Proving Ground successfully proved that this type of fin design made with the investment casting process. It survived the gun launch environment with the fin tabs intact. More important, the result from the AEDC wind tunnel test showed that this fin design did provide adequate flight stability, low drag and desired spin moment.

While certain preferred embodiments of the present invention have been disclosed in detail, it is to be understood that various modifications may be adopted without departing from the spirit of the invention or scope of the following claims.

I claim:

1. A projectile fin formed with a laterally extending flat, triangular shaped member positioned so that one point of the triangle points in the intended projectile direction and tilted in respect to such direction so that air pressure will impinge on one surface of said member during projectile flight to provide rotation to the projectile.

2. The projectile fin of claim 1 wherein said triangular shaped member is attached to the outermost edge of the fin.

3. The projectile fin of claim 1 wherein the fin is constructed of a metal having a higher melting temperature and strength than aluminum or aluminum base alloy.

4. The projectile fin of claim 1 wherein the fin is constructed of stainless steel.

5. The projectile fin of claim 1 wherein the flat triangular shaped member is tilted upwardly at an angle of from about 2 degrees to 7 degrees in respect to the intended projectile direction.

6. A cylindrically shaped projectile formed with thin flat stabilization fins extending transversely of said projectile and positioned equidistant to one another, each such fin having a laterally extending, flat triangular shaped member positioned so that one point of the triangle points in the intended projectile direction and angled in respect to such direction so that air pressure will impinge on one surface of said member during projectile flight to provide spin to said projectile.

7. The projectile of claim 6 wherein the fins are constructed of a metal having a higher melting temperature and strength than aluminum or aluminum base alloys.

8. The projectile of claim 6 wherein the fins are constructed of stainless steel.

9. The projectile of claim 6 wherein the flat triangular shaped members are each tilted at an angle of from about 2 to 7 degrees in respect to the intended projectile direction.

10. The projectile of claim 6 wherein the fins are constructed of a material of higher heat resistance and strength than aluminum or aluminum base alloys.

* * * * *